United States Patent [19]

Ogawa

[11] Patent Number: 5,606,802
[45] Date of Patent: Mar. 4, 1997

[54] LASER GRADIENT SETTING DEVICE

[75] Inventor: Yohei Ogawa, Tokyo-to, Japan

[73] Assignee: Kabushiki Kaisha TOPCON, Tokyo-to, Japan

[21] Appl. No.: 392,048

[22] Filed: Feb. 22, 1995

[51] Int. Cl.⁶ .............................. G01B 11/26; G01C 5/00
[52] U.S. Cl. .................. 33/276; 33/280; 33/283; 33/291; 33/DIG. 21; 356/138
[58] Field of Search ............................ 33/276, 278, 280, 33/281, 282, 283, 285, 286, 529, 533, 645, DIG. 21, 290, 291, 293, 295; 356/253, 254, 255, 138, 443

[56] References Cited

U.S. PATENT DOCUMENTS

| | | | |
|---|---|---|---|
| 2,874,605 | 2/1959 | Williamson | 356/255 |
| 2,988,952 | 6/1961 | Hopkins | 33/282 |
| 3,471,234 | 10/1969 | Studebaker | 33/285 |
| 3,475,101 | 10/1969 | Jeffery, Sr. | 33/290 |
| 3,736,058 | 5/1973 | Iadarola | 33/DIG. 21 |
| 3,874,088 | 4/1975 | Shaffer, Jr. | 33/286 |
| 3,911,588 | 10/1975 | Ohneda | 33/286 |
| 4,053,238 | 10/1977 | George et al. | 33/DIG. 21 |
| 4,490,919 | 1/1985 | Feist et al. | 33/290 |
| 4,660,983 | 4/1987 | Yamamoto et al. | 356/445 |
| 4,681,439 | 7/1987 | Shoemaker | 33/286 |
| 4,726,685 | 2/1988 | Kobayashi et al. | 356/445 |
| 4,988,192 | 1/1991 | Knittel | 33/281 |
| 5,218,770 | 6/1993 | Toga | 33/276 |

Primary Examiner—Christopher W. Fulton
Attorney, Agent, or Firm—Nields & Lemack

[57] ABSTRACT

A laser gradient setting device, having such an arrangement that a reference laser beam with a gradient is emitted and a reference laser beam in vertical direction is emitted, whereby the laser gradient setting device can be easily positioned by the reference laser beam in vertical direction by a single worker.

6 Claims, 6 Drawing Sheets

LASER GRADIENT SETTING DEVICE

BACKGROUND OF THE INVENTION

The present invention relates to a laser gradient setting device for setting reference lines in civil engineering works.

In civil engineering works, it is necessary to have a horizontal reference line or a reference line tilted at a given angle with respect to horizontal line. A laser gradient setting device is used for setting such reference lines.

For example, in case concrete pipes are laid for sewage construction, the pipes must be laid without bending and must be tilted at a given angle.

As typical working processes to bury and lay concrete pipes, and so on in soil, there are the working processes to excavate the ground, to lay concrete pipes one after another into the excavated ditch, and to bury them.

For each given linear section, the ground is excavated to a depth deeper than the depth where concrete pipes are to be laid, and concrete pipes are laid on a temporary base at the bottom of the ditch.

These concrete pipes are used as a flow passage for city water, sewage or other liquid, and these are laid at a given inclination and without bending. If the buried concrete pipes are twisted or turned upward, downward, leftward or rightward, the liquid is stagnated, stopped or leaks out into soil, thus being unable to fulfill the function as a flow passage. Therefore, a proper reference line must be set when concrete pipes are to be installed.

A laser beam is suitable for providing such a reference line because it has not become slack (as thread does when it is used over a long distance) and because it causes no disturbance during work and it is not cut off due to interference with concrete pipe or working personnel.

The laser gradient setting device is used for setting a reference line when concrete pipes are installed.

Description is now given of a conventional type laser gradient setting device in connection with FIGS. 5 and 6.

A conventional type laser gradient setting device 1 in horizontal installment emits a laser beam, which provides a reference line in horizontal direction. If the laser beam is aligned with horizontal line, it provides a horizontal reference line. If the laser beam is tilted at a given angle, it gives a reference line with a gradient.

For each given linear section, a vertical hole 3 deeper than the depth at which the concrete pipe is to be laid is excavated at a starting point to bury the concrete pipe 2, and a burying ditch 4 continuous to the vertical hole 3 excavated at a depth deeper than the depth where the concrete pipe is laid. The laser gradient setting device 1 is installed in the vertical hole 3. A laser beam is emitted at a gradient θ, and a reference laser beam L is provided. The concrete pipe 2 is laid in the burying ditch 4 via a temporary base 5 in such manner that its axis corresponds with the reference laser beam L.

When the axis of the concrete pipe 2 corresponds with the reference laser beam L, the concrete pipe 2 is buried by filling the burying ditch 4.

The laser gradient setting device 1 must be installed accurately in horizontal position when it is initially installed. In the past, it has been customary to install the laser gradient setting device 1 in horizontal position as follows: A support 6 is provided above the vertical hole 3, and a transit 7 is placed on the support 6. A plumb bob 8 is suspended from the transit 7 to set a known point 10. Further, the laser gradient setting device is installed in the vertical hole 3, and the plumb bob 8 is aligned with the center of the laser gradient setting device. Then, the plumb bob 9 is suspended from the laser gradient setting device 1 to align the plumb bob 9 with the known point 10.

In the conventional positioning method to use the plumb bob, there must be two workers to position the plumb bob, to stop swinging of the plumb bob and to adjust thread length, and adjustment must be repeated in order to accurately align the plumb bob from the transit and the plumb bob from the laser gradient setting device with each reference point. This means low working efficiency and very complicated working procedure. The above adjustment must be repeated when deviation occurs due to vibration caused by passing vehicles during work or when the work is resumed after temporary interruption, or when regular checking is performed. Thus, much time is required for such adjustment.

SUMMARY OF THE INVENTION

It is an object of the present invention to provide a laser gradient setting device, which can be easily positioned by a single worker. To attain this object, the laser gradient setting device of the present invention emits a reference laser beam in vertical direction in addition to the emission of a reference laser beam at a gradient, and the position of the laser gradient setting device is determined by the vertical reference laser beam.

DETAILED DESCRIPTION OF THE PREFERRED EMBODIMENT

Figure 1:
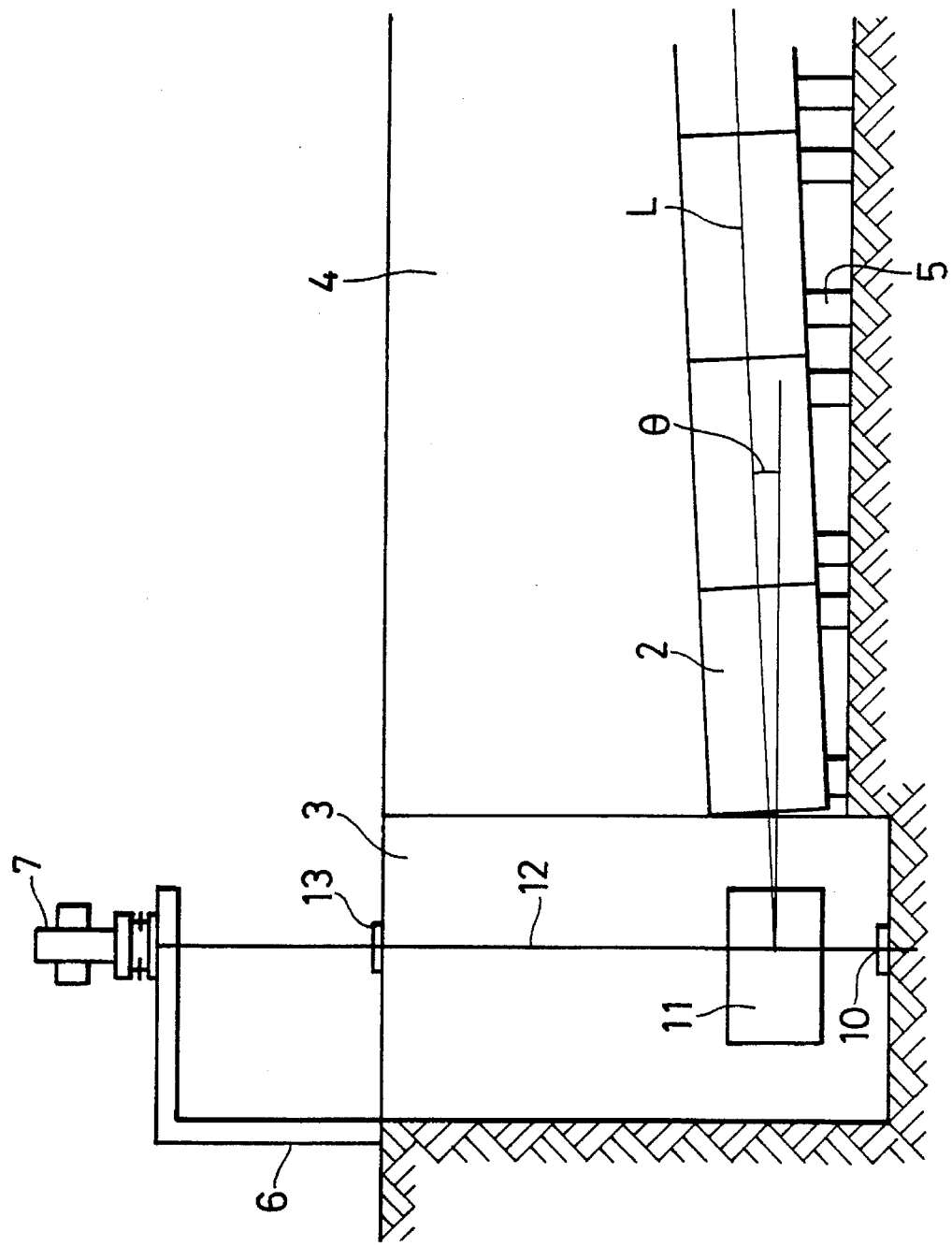
FIG. 1 is a schematic view of an embodiment of the present invention.

In the following, description will be given of an embodiment of the present invention, referring to the drawings.

Figure 5:
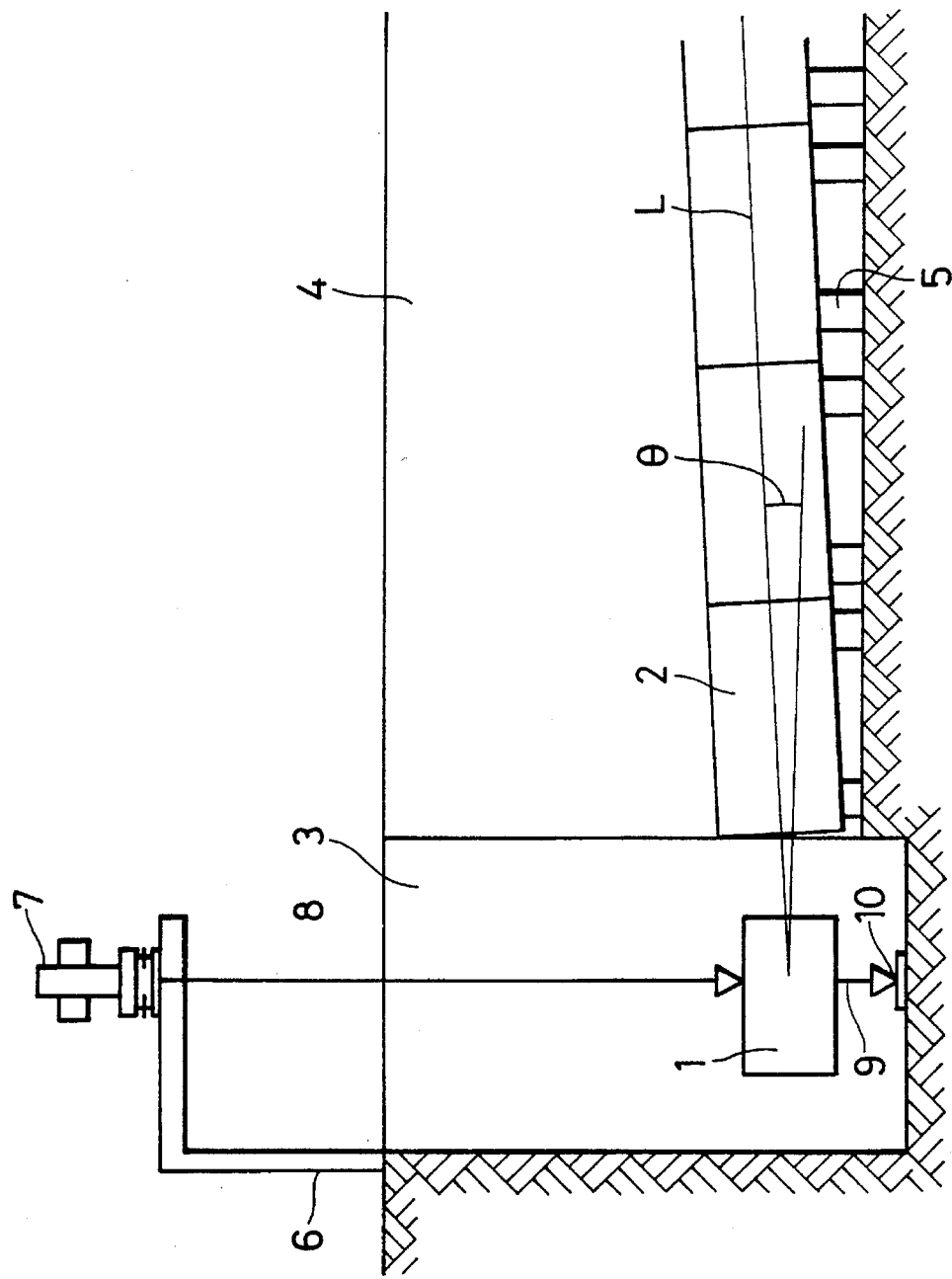
FIG. 5 is a schematic side view of an embodiment of a conventional type device.
Figure 6:
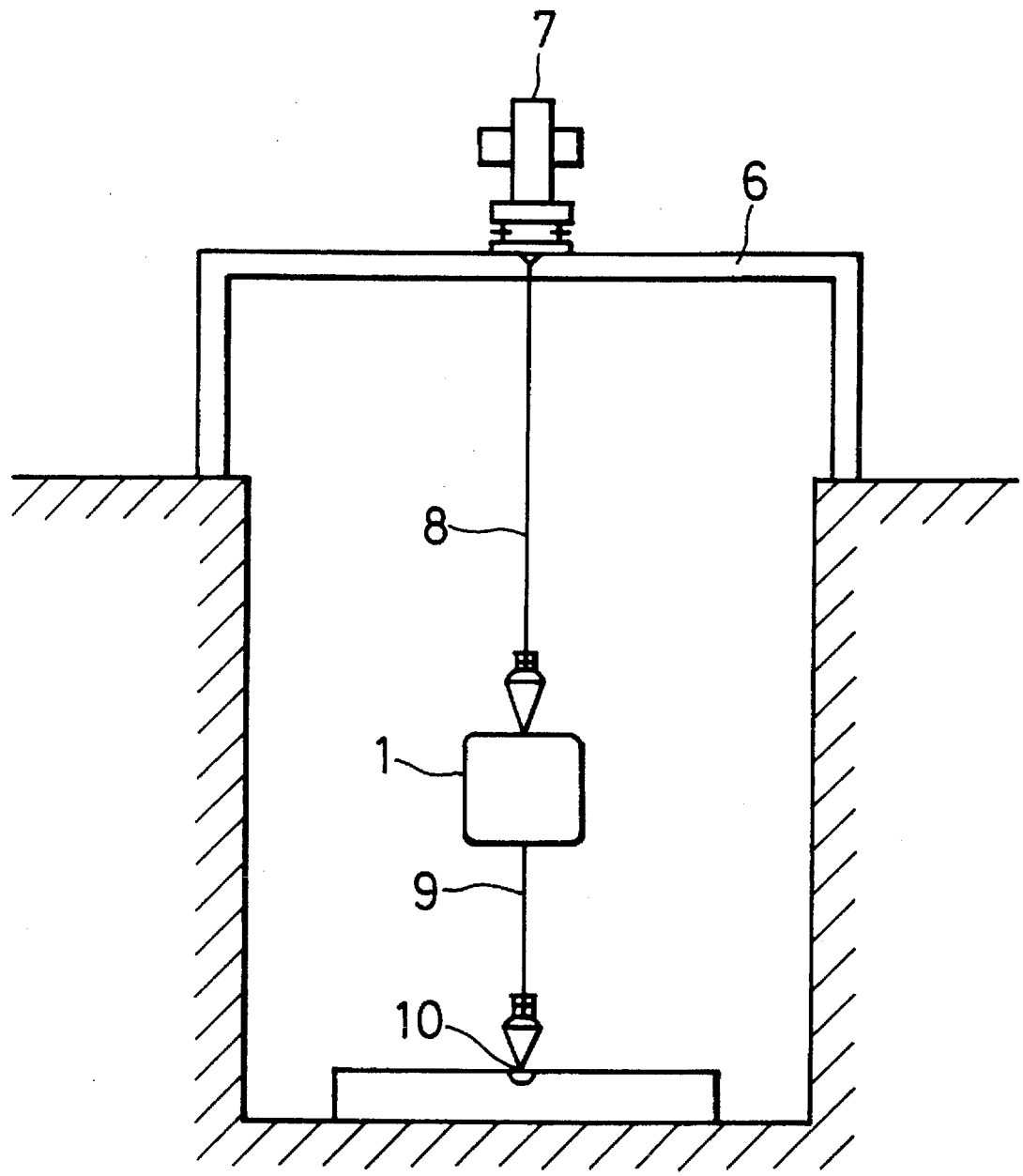
FIG. 6 is a schematic front view of the embodiment of the conventional type device.

In FIG. 1, components which are the same as those in FIG. 5 are referred to by the same symbol.

A laser gradient setting device 11 emits a laser beam 12 in vertical direction in addition to the beam in horizontal direction. By aligning the downward laser beam 12 with the known point 10 and by aligning the upward laser beam 12 with the reference point of the transit 7, the laser gradient setting device 11 can be easily positioned.

Instead of aligning the laser beam 12 with the reference point of the transit 7, a target 13 may be set at a reference position and the laser beam 12 may be aligned with the target 13.

Figure 2:
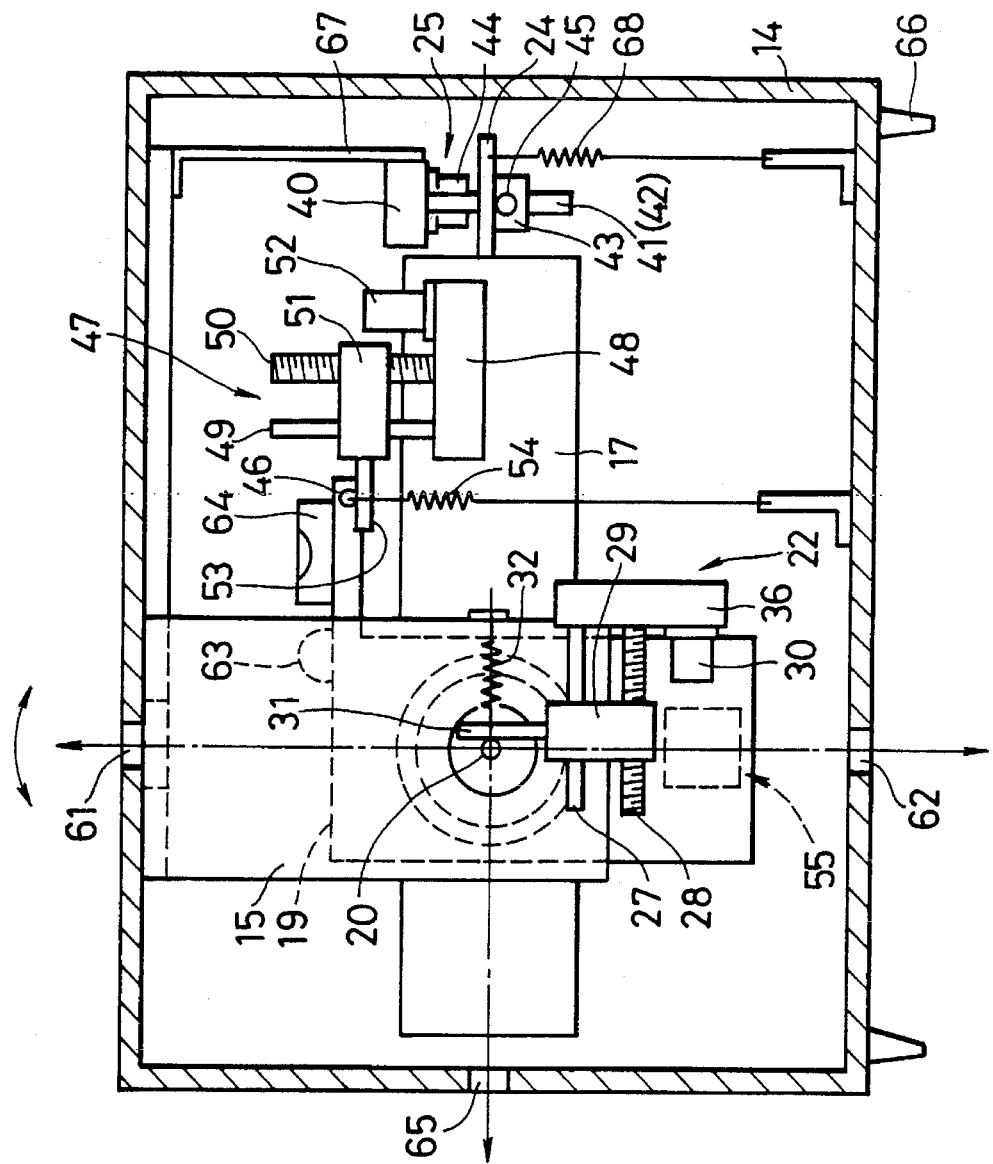
FIG. 2 is a cross-sectional elevation of the embodiment.
Figure 3:
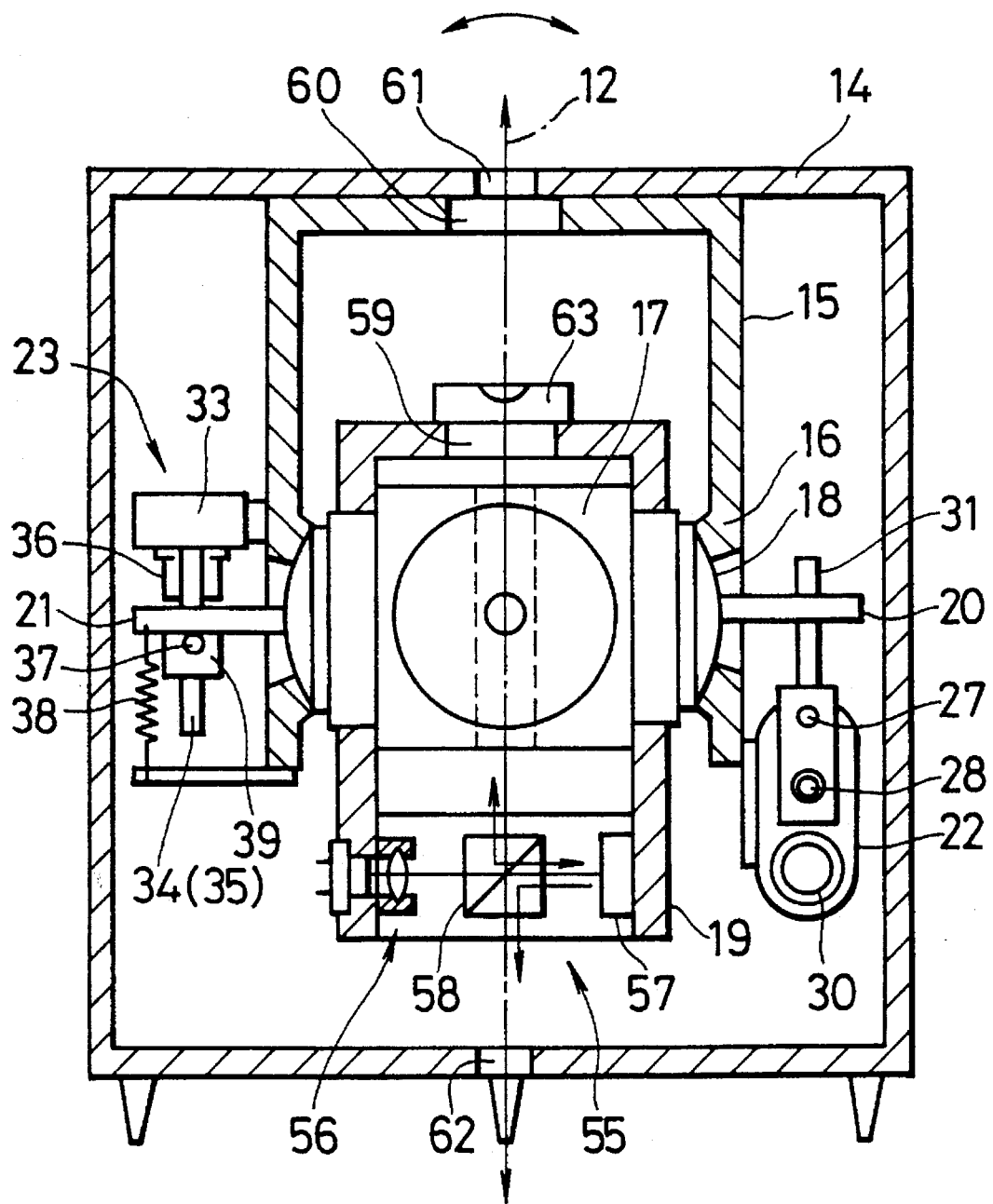
FIG. 3 is a cross-sectional front view of the embodiment.
Figure 4:
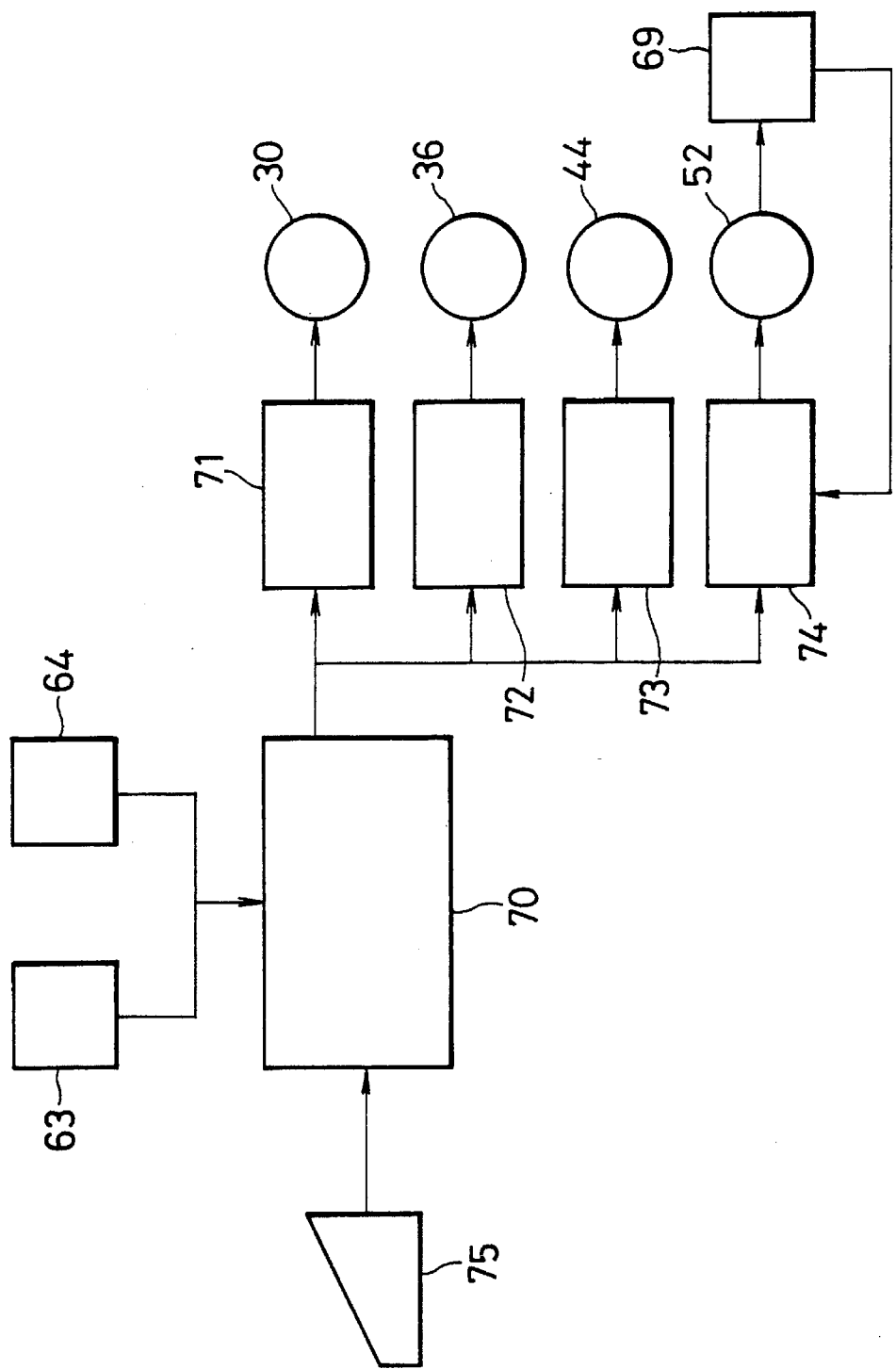
FIG. 4 is a control block diagram of the embodiment.

Next, the laser gradient setting device 11 will be described, referring to FIG. 2 and FIG. 3.

In an external frame 14 in box shape, a suspension frame 15 with two plate arms hanging parallel downward is provided, and a pair of spherical seats 16 having shaft center in horizontal direction are placed face-to-face to each other inside the arms of the suspension frame 15.

On each side of a reference laser beam emitter 17, a spherical shaft 18 protrudes. By engaging the spherical shaft 18 with the spherical seat 16, the reference laser beam emitter 17 can be rotatably mounted in triaxial direction with respect to the suspension frame 15.

On the spherical shaft 18, a spherical surface to engage with the spherical seat 16 is formed at its forward end, and a cylindrical portion is formed at the base. On the cylindrical portion, a rocking frame 19 in concave shape with its lower end open is rotatably mounted. From the spherical surface of the spherical shaft 18, pins 20 and 21 protrude in two horizontal directions.

A left-right rotation drive unit 22 is provided on the pin 20 of the suspension frame 15, and a twist drive unit 23 is provided on the pin 21. From rear end surface of the reference laser beam emitter 17, a pin 24 aligned with the reference laser beam L protrudes, and an elevation drive unit 25 is provided on the pin 24.

The left-right rotation drive unit 22 comprises a gear box 26 fixed on the suspension frame 15, a guide shaft 27 provided in horizontal direction from the gear box 26, a screw shaft 28, a slider 29 screwed with the screw shaft 28 and slidably engaged with the guide shaft 27, and a left-right adjusting motor 30 for rotating the screw shaft 28 via the gear box 26. On the slider 29, an engaging pin 31 slidably engaged with the pin 20 is mounted, and the pin 20 is pushed rightward in FIG. 2 by a spring 32 so that the pin 20 is permanently in contact with the engaging pin 31.

When the left-right adjusting motor 30 is rotated, the screw shaft 28 is rotated, and the slider 29 is displaced in horizontal direction. The horizontal displacement of the slider 29 is transmitted to the pin 20 via the engaging pin 31, thus rotating the reference laser beam emitter 17 integrally with the rocking frame 19 in left and right directions.

The twist drive unit 23 comprises a gear box 33 fixed on the suspension frame 15, a guide shaft 34 arranged vertically from the gear box 33, a screw shaft 35 (not shown), a slider 39 screwed with the screw shaft 35 and slidably engaged with the guide shaft 34, and a twist driving motor 36 for rotating the screw shaft 35 via the gear box 33. On the slider 39, an engaging pin 37 slidably engaged with the pin 21 is mounted, and the pin 21 is pushed downward in FIG. 3 by a spring 38 so that the pin 21 is permanently in contact with the engaging pin 37.

When the twist driving motor 36 is rotated, the screw shaft 35 rotated and the slider 39 is displaced in vertical direction. The vertical displacement of the slider 39 is transmitted to the pin 21 via the engaging pin 37, and the reference laser beam emitter 17 is twisted integrally with the rocking frame 19.

The elevation drive unit 25 comprises a gear box 40 fixed on the external frame 14 via a bracket 67, a guide shaft 41 arranged vertically from the gear box 40, a screw shaft 42 (not shown), a slider 43 screwed with the screw shaft 42 and slidably engaged with the guide shaft 41, and an elevation driving motor 44 for rotating the screw shaft 42 via the gear box 40. On the slider 43, an engaging pin 45 slidably engaged with the pin 24 is mounted, and the pin 24 is pushed downward in FIG. 2 by a spring 68 so that the pin 24 is permanently in contact with the engaging pin 45.

When the elevation driving motor 44 is rotated, the screw shaft 42 is rotated, and the slider 43 is displaced in vertical direction. The vertical direction of the slider 43 is transmitted to the pin 24 via the engaging pin 45, and the reference laser beam emitter 17 is tilted integrally with the rocking frame 19.

On the rear end of the rocking frame 19, a pin 46 extending in parallel to the pin 20 is mounted. Via the pin 46, an angle setting unit 47 for relatively rotating the reference laser beam emitter 17 and the rocking frame 19 is mounted on a side of the reference laser beam emitter 17.

The angle setting unit 47 comprises a gear box 48 fixed on a side of the reference laser beam emitter 17, a guide shaft 49 arranged vertically from the gear box 48, a screw shaft 50, a slider 51 screwed with the screw shaft 50 and slidably engaged with the guide shaft 49, and an angle setting motor 52 for rotating the screw shaft 50 via the gear box 48. The angle setting motor 52 is provided with an encoder 69 (to be described later). An engaging pin 53 is mounted on the solder 51. The pin 53 is slidably engaged with the pin 46. The pin 46 is pushed downward in FIG. 2 by a spring 54 so that the pin 46 is permanently in contact with the engaging pin 53.

When the angle setting motor 52 is rotated, the screw shaft 50 rotated, and the slider 51 is displaced in vertical direction. The vertical displacement of the slider 51 is transmitted to the pin 46 via the engaging pin 53, and the rocking frame 19 is tilted with respect to the reference laser beam emitter 17.

On lower end of the rocking frame 19, a vertical beam emitting unit 55 is provided.

Description will be given now on the vertical beam emitting unit 55.

A laser beam emitter 56 is arranged on one of opposing vertical walls of the rocking frame 19. On the other of the vertical inner walls, a reflection mirror 57 is provided face-to-face to the laser beam emitter 56. A beam splitter 58 is arranged between the reflection mirror 57 and the laser beam emitter 56, and the laser beam emitted from the laser beam emitter 56 is split and reflected to transmission light and laser beam 12, which passes through the center of rotation of the reference laser beam emitter 17 (center of spherical surface of the spherical shaft 18).

On the rocking frame 19, on the suspension frame 15 and on upper and lower surfaces of the external frame 14, through-holes 59, 60, 61 and 62 for passing the laser beam 12 are provided. On upper surface of the rocking frame 19, a tilt sensor 63 in parallel to the pin 20 and a tilt sensor 64 perpendicular to the tilt sensor 63 are mounted. On the front surface of the external frame 14, a through-hole 65 for passing the reference laser beam L is provided, and support legs 66 are attached on lower surface of the external frame 14. The support legs 66 fulfill adjusting function, performing coarse adjustment for horizontal positioning of the external frame 14.

The left-right adjusting motor 30 of the left-right rotation drive unit 22 is driven by a left-right adjusting controller 71, the twist driving motor 36 of the twist drive unit 23 is driven by a twist controller 72, the elevation driving motor 44 of the elevation drive unit 25 is driven by an elevation controller 73, and the angle setting motor 52 of the angle setting unit 47 is driven by an angle controller 74. Rotation angle signal from an encoder 69 is inputted to the angle controller 74.

The left-right adjustment controller 71, the twist controller 72, the elevation controller 73, and the angle controller 74 are controlled by a control unit 70 respectively. To the control unit 70, detection signals from the tilt sensor 63 and the tilt sensor 64 are inputted, and a control panel 75 is connected to the control unit 70.

In the following, description will be given the operation.

First, the laser gradient setting device 11 is installed in the vertical hole 3, and coarse horizontal adjustment is performed by the support legs 66. The control unit 70 is started by operating the switches on the operation panel 75.

The angle setting motor 52 is driven, and mechanical reference position of the reference laser beam emitter 17 and the rocking frame 19 are adjusted, i.e. adjustment is made in such manner that the plane where the tilt sensor 63 and the tilt sensor 64 are mounted is aligned in parallel to optical axis of laser beam of the reference laser beam emitter 17.

Next, based on the detection results of the tilt sensors 63 and the tilt sensor 64, control command is issued to the left-right adjusting controller 71, the twist controller 72, and the elevation controller 73 in order to turn the detection results of the tilt sensor 63 and the tilt sensor 64 to zero, i.e. to set the plane where the tilt sensor 63 and the tilt sensor 64 are mounted in horizontal direction. By this control command, the left-right adjusting controller 71, the twist controller 72, and the elevation controller 73 drive the left-right adjusting motor 30, the twist driving motor 36 and the elevation driving motor 44 respectively.

When the tilt sensors 63 and 64 are turned to horizontal condition, the reference laser beam L emitted from the reference laser beam emitter 17 is directed in horizontal direction, and the laser beam 12 turned in vertical direction by the beam splitter 58 is directed in vertical direction.

The horizontal position of the laser gradient setting device 11 is adjusted to direct the laser beam 12 in such manner that the known point 10 is aligned with the reference point of the transit 7 or the target 13 (see FIG. 1). The adjustment of the position of the laser gradient setting device 11 by the laser beam 12 can be performed by adjusting the posture of the laser gradient setting device 11 itself, and this can be carried out by a single worker.

In case it is desired to tilt the reference laser beam L, gradient is set and inputted to the control unit 70 from the operation panel 75. The control unit 70 issues drive command to the angle controller 74, and the angle controller 74 inputs driving pulse corresponding to the driving command to the angle setting motor 52. The angle setting motor 52 is rotated in proportion to the number of the driving pulses. Actual amount of rotation is detected by the encoder 69, and the amount of rotation of the angle setting motor 52 is monitored. Thus, only the rocking frame 19 is tilted.

When tilting operation of the rocking frame 19 is completed, completion signal is inputted to the control unit 70, and control command is issued to the left-right adjusting controller 71, the twist controller 72, and the elevation controller 73 to turn the rocking frame 19 in horizontal condition.

The operation to turn the rocking frame 19 in horizontal condition is the same as described above, and detailed description is not given here.

When the rocking frame 19 is turned in horizontal condition again, the reference laser beam L emitted from the reference laser beam emitter 17 is set at the desired gradient.

By aligning with the reference laser beam L, it is possible to lay the concrete pipe 2 at the desired gradient and without bending.

In the above embodiment, the laser beam emitter 56 is separately furnished to emit the laser beam 12, while the reference laser beam L emitted from the reference laser beam emitter 17 may be split and may be used as the laser beam 12. As the beam splitting means, a half-mirror may be used instead of the beam splitter.

What we claim are:

1. A laser gradient setting device, comprising a reference laser beam emitter for emitting a reference laser beam with a gradient, a supporting means for rotatably supporting the reference laser beam emitter by spherical bearings, and a laser beam irradiating means for emitting a laser beam in a vertical direction.

2. A laser gradient setting device according to claim 1, comprising said reference laser beam emitter having a pair of spherical bearings and rotatably supported in triaxial directions via said spherical bearings, and a rocking frame pivotable on a center line of said spherical bearings, wherein said rocking frame is provided with a beam splitting means arranged on an optical axis passing through the center of rotation of said reference laser beam emitter, said laser beam irradiating means arranged on one side of the beam splitting means, and a reference mirror arranged on the other side of said beam splitting means.

3. A laser gradient setting device according to claim 1, comprising said reference laser beam emitter having a pair of spherical bearings and rotatably supported in triaxial directions via said spherical bearings, and a beam splitting means, wherein said beam splitting means is arranged on an optical path of the reference laser beam, thereby splitting the reference laser beam in vertical direction so that an optical axis of the split beam passes through the center of rotation of the reference laser beam emitter.

4. A laser gradient setting device according to one of claims 1 to 3, comprising said reference laser beam emitter having on each side a shaft having a cylindrical portion at the base end and a spherical surface at forward end and rotatably supported in triaxial directions via said spherical surface at forward end of the shaft, a rocking frame rotatably supported on the cylindrical portion of the shaft, a first and a second pins protruding from and aligned with an axial center of the shaft, a third pin protruding from and aligned with an optical axis of said reference laser beam emitter, a fourth pin protruding from said rocking frame, a left-right rotation drive unit for displacing the first pin in a horizontal direction, a twist drive unit for displacing the second pin in a vertical direction, an elevation drive unit for displacing the third pin in a vertical direction, and an angle setting unit for displacing the fourth pin in a vertical direction.

5. A laser gradient setting device according to claim 4, wherein the first to the fourth pins are rod-like members with circular cross-section, and the members attached to and displacing these pins are rod-like members having circular cross-section.

6. A laser gradient setting device according to claim 1, comprising said reference laser beam emitter having a pair of spherical bearings and rotatably supported in triaxial directions via said spherical bearings, and a rocking frame pivotable on a center line of said spherical bearings, a laser beam irradiating means arranged on said rocking frame, and driving means for rotating said reference laser beam emitter and directing said laser beam irradiating means to a vertical direction.

\* \* \* \* \*